United States Patent Office 3,780,078
Patented Dec. 18, 1973

3,780,078
METHOD OF PRODUCING π-ALLYLIC NICKEL COMPLEXES
Konstantin Mikhailovich Anikeev, Sredneokhtinsky prospekt 25/19, kv. 18; Boris Davidovich Babitsky, ulitsa Krasnogo Kursanta 7, kv. 9; Alexi Matveevich Verblovsky, Onezhskaya ulitsa 4, kv. 31; Tamara Nikolaevna Kozhenets, Moskovsky prospekt 79, kv. 39; Vitaly Abramovich Kormer, ulitsa Zheleznovodskaya 62, kv. 2; Mark Iosifovich Lobach, Annikov prospekt 28, kv. 52; and Viktoria Vladimirovna Markova, ulitsa Bolotnaya 11, kv. 18, all of Leningrad, U.S.S.R.; and Ervin Mikhailovich Rivin, Leninsky prospekt 17, kv. 44, Voronezh, U.S.S.R.
No Drawing. Filed July 28, 1971, Ser. No. 166,988
Claims priority, application U.S.S.R., Aug. 3, 1970, 1456941
Int. Cl. C07f 15/04
U.S. Cl. 260—439 R   4 Claims

ABSTRACT OF THE DISCLOSURE

A method of producing π-allylic nickel complexes by reacting nickel tetracarbonyl with diene hydrocarbons in the presence of proton acids. The reaction is effected on heating in a solvent which is inert in respect to said reagents with simultaneous removal of the evolving carbon monoxides.

---

The present invention relates to methods of producing π-allylic nickel complexes from nickel tetracarbonyl.

Said π-allylic complexes may be used in a commercial process for catalytically converting unsaturated hydrocarbons.

Known in the art is a method of producing π-allyl nickel halides from nickel tetracarbonyl in two stages. In the first stage allylhalides are produced by halogenation of olefins hydrocarbons or by hydrohalogenation of 1,3-diene hydrocarbons. In the second stage the resulting allyl halides are heated at 70° C. with nickel tetracarbonyl in an aromatic hydrocarbons solution whereby they are converted into π-allyl nickel halides.

Said prior art method has a disadvantage residing in the necessity of a two-stage synthesis which makes its commercial employment rather complicated.

As far as the production of π-allylic nickel complexes containing other acidoligands is concerned such complexes are usually produced by an exchange reaction of π-allyl nickel halides with alkali salts of corresponding acids which causes a further increase in the number of process stages (D. Walter, G. Wilke, Angew. Chem., 78, 141 (1966)).

It is an object of the present invention to provide a single-stage method of producing π-allylic nickel complexes containing various acidoligands, which can be suitable for commercial implementation.

In accordance with the above-mentioned and other objects the invention resides in that a method of producing π-allylic nickel complexes is carried out in a single stage comprising the reaction of nickel tetracarbonyl with a diene hydrocarbon in the presence of proton acids.

Diene hydrocarbons of aliphatic and alicyclic series are used as the diene hydrocarbons.

As the proton acids use is made of compounds selected from the group HCl, HBr, HI, HCN, HSCN, CH$_3$COOH, CCl$_3$COOH, CF$_3$COOH, n-CH$_3$C$_6$H$_4$SO$_3$H.

The method according to the present invention makes it possible to produce π-allylic nickel complexes of the formula:

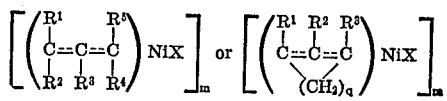

wherein $R^1$, $R^2$, $R^3$, $R^4$, $R^5$ are hydrogen, an alkyl, cycloalkyl, or alkenyl, X is an anion selected from the group consisting of Cl, Br, I, CN, SCN, CH$_3$COO, CCl$_3$COO, CFCOO, n-CH$_3$C$_6$H$_4$SO$_3$.

The method of producing π-allylic nickel complexes according to the present invention is effected in the following manner: A diene hydrocarbon, nickel tetracarbonyl and a proton acid interact in an aliphatic or aromatic solvent medium or in ether at 20°–75° C. with vigorous stirring for a period of 5–150 minutes. Nickel tetracarbonyl is taken in excess relative to the diene and the proton acid (e.g. 2- or 3-fold excess).

If the proton acid is a gaseous substance (HCl, HBr, HI), a corresponding hydrogen halide is passed through the reaction mixture during the synthesis. If the proton acid is in a liquid or solid form, the entire amount of the acid is charged into the reaction vessel at the beginning of the synthesis. The evolving carbon monoxide is evacuated from the reaction sphere. The resultant π-allylic nickel complex is separated from the reaction mixture by removing the liquid phase and dissolving the dry residue in an aromatic hydrocarbon.

The π-allylic nickel complexes thus synthesized may be used as catalysts for the conversion of unsaturated hydrocarbons, e.g. for a stereospecific polymerization of butadiene and isoprene.

The present invention is further illustrated by the following examples of producing π-allylic nickel complexes.

EXAMPLE 1

100 ml. of toluene, 0.05 g.-mol. of pentadiene-1,3 and 0.15 g.-mol. of nickel tetracarbonyl were charged into a 250 ml. flask. Dry hydrogen chloride was introduced into the solution with stirring. The contents of the flask was heated to 65° C. and then the reaction was carried out at 65°–69° C. for 20 minutes, whereupon the colour of the solution was changed from light yellow to deep red. The excess of the hydrogen chloride was evacuated from the reaction sphere along with the evolving carbon monoxide. On completion of the reaction the hydrogen chloride supply was stopped and after cooling the reaction mixture to room temperature the excess of the nickel carbonyl was distilled off along with toluene at 40°–50° C. (2–5 mm. Hg). The dry product was dissolved in toluene and solid impurities were filtered off. The yield of 1,3-dimethyl-π-allyl nickel chloride was 37.4% of the theoretical value based on the starting pentadiene-1,3.

EXAMPLE 2

The synthesis was carried out under the same conditions as described in Example 1 except that hydrogen iodide was employed instead of hydrogen chloride. The reaction was carried out at 52°–62° C. for 10 minutes. The yield of 1,3-dimethyl-π-allyl nickel iodide was 7.65% of its theoretical value.

EXAMPLE 3

100 ml. of toluene, 0.05 g.-mol. of pentadiene-1,3, 0.05 g.-mol. of trichloroacetic acid and 0.15 g.-mol of nickel carbonyl were placed in a flask. The reaction was carried out at 64°–70° C. for 25 minutes. The yield of 1,3-dimethyl-π-allyl nickel trichloroacetate was 25.7% of its theoretical vallue.

EXAMPLE 4

The synthesis was carried out under the same conditions as described in Example 3 except that trifluoroacetic acid was employed instead of trichloroacetic acid. The yield of 1,3-dimethyl-π-allyl nickel trifluoroacetate was 34.5% of its theoretical value.

EXAMPLE 5

Interaction of 0.05 g.-mol. of pentadiene-1,3, 0.05 g.-mol. of p-toluenesulphonic acid and 0.15 g.-mol. of nickel carbonyl in 100 ml. of benzene was effected at 60°–75° C. for a period of 70 minutes. The yield of 1,3-dimethyl-$\mu$-allyl nickel-p-toluene sulphonate was 9% of its theoretical value.

EXAMPLE 6

The synthesis was carried out under the same conditions as described in Example I, but instead of pentadiene-1,3 butadiene-1,3 was employed. The yield of $\pi$-crotyl nickel chloride was 41.5% of its theoretical value.

EXAMPLE 7

The synthesis was carried out under the conditions described in Example 1, but instead of pentadiene-1,3 2-methyl butadiene-1,3 was employed. The yield of 1,1-dimethyl-$\pi$-allyl nickel chloride was 21.6% of its theoretical value.

EXAMPLE 8

The synthesis was carried out under the conditions described in Example 1, but instead of pentadiene-1,3 cyclohexadiene-1,3 was employed. The yield of $\pi$-cyclohexenyl nickel chloride was 12% of its theoretical value.

EXAMPLE 9

The synthesis was carried out under the conditions of Example 1, but instead of toluene as a solvent, use was made of n-hexane. The reaction product sparingly soluble in n-hexane was precipitated and the precipitate was separated from the solution by filtration on cooling and was dissolved in toluene. The resulting toluene solution of 1,3-dimethyl-$\mu$-allyl nickel was filtered to remove insoluble impurities. The yield of the complex was 28.9% of the theoretical value.

EXAMPLE 10

The synthesis was carried out under the conditions of Example 3 but instead of trichloroacetic acid, acetic acid was employed and instead of toluene, diethyl ether was employed. The yield of 1,3-dimethyl-$\pi$-allyl nickel acetate was 32.8% of the theoretical value.

Thus it is seen that, the method according to the present invention makes it possible to synthesize $\pi$-allylic nickel complexes with various acidoligands in one stage.

This considerably simplifies the synthesis technology of complexes which are useful as active catalysts for catalytic conversions of unsaturated compounds, e.g. for a stereospecific polymerization of olefines and dienes.

We claim:

1. A method of producing $\pi$-allylic nickel complexes which comprises reacting nickel tetracarbonyl with a conjugated diene hydrocarbon in the presence of a proton acid selected from the group consisting of HCl, HBr, HI, HCN, HSCN, $CH_3COOH$, $CCl_3COOH$, $CF_3COOH$ and n-$CH_3C_6H_4SO_3H$ with heating in a solvent medium which is inert with respect to said reagents and simultaneously removing the evolving carbon monoxide from the reaction zone.

2. A method as claimed in claim 1, wherein dienes of aliphatic and alicyclic series are used as the diene hydrocarbons.

3. A method as claimed in claim 1, wherein the synthesis is carried out at a temperature of from 20° to 75° C. in the presence of a solvent selected from the group consisting of aliphatic hydrocarbons, aromatic hydrocarbons and ethers.

4. The method of claim 1 wherein the conjugated diene hydrocarbon is a member selected from the group consisting of pentadiene-1,3, butadiene-1,3,2-methyl butadiene-1,3 and cyclohexadiene-1,3.

References Cited

UNITED STATES PATENTS

| | | | |
|---|---|---|---|
| 1,725,156 | 8/1929 | Meisenburg | 260—654 R |
| 3,055,954 | 9/1962 | Montagna et al. | 260—654 R |
| 3,432,530 | 3/1969 | Wilke | 260—429 L |
| 3,567,794 | 3/1971 | Eberly | 260—654 R |

OTHER REFERENCES

Wilke et al.: Angewandte Chemie, International Edition (5), 1966, p. 159.

Sharaev et al.: Dokl. Akad. Nauk SSSR, 164 (1965), pp. 119–121.

Fischer et al.: Zeitschrift für Naturforschung, 16b (1961), pp. 77–78.

DANIEL E. WYMAN, Primary Examiner

A. P. DEMERS, Assistant Examiner

U.S. Cl. X.R.

252—431 R; 260—94.3, 429 L

UNITED STATES PATENT OFFICE
CERTIFICATE OF CORRECTION

Patent No. 3780078          Dated December 18, 1973

Inventor(s) KONSTANTIN M. ANIKIEV et al

It is certified that error appears in the above-identified patent and that said Letters Patent are hereby corrected as shown below:

Column 1, line 65, "$n-CH_3C_6H_4SO_3H$" should read -- $p-CH_3C_6H_4SO_3H$ --. Column 2, line 4, "$n-CH_3C_6H_4SO_3H$" should read -- $p-CH_3C_6H_4SO_3H$ --. Column 4, line 9, "$n-CH_3C_6H_4SO_3H$" should read -- $p-CH_3C_6H_4SO_3H$ --.

Signed and sealed this 8th day of October 1974.

(SEAL)
Attest:

McCOY M. GIBSON JR.          C. MARSHALL DANN
Attesting Officer          Commissioner of Patents

UNITED STATES PATENT OFFICE
CERTIFICATE OF CORRECTION

PATENT NO. : 3780078
DATED : December 18, 1973
INVENTOR(S) : KONSTANTIN M. ANIKIEV, ET AL It is certified that error appears in the above-identified patent and that said Letters Patent are hereby corrected as shown below:

Column 1, line 26, "monoxides" should read --monoxide--;
Column 1, line 50, "stages" should read --stage--;
column 1, line 50, "141" should read --941--;
column 3, line 6, "$\mu$-allyl" should read --$\pi$-allyl--;
column 3, line 34, "1,3-dimethyl-$\mu$-allyl nickel" should read --1,3-dimethyl-$\pi$-allyl nickel chloride--.

Signed and sealed this 29th day of April 1975.

(SEAL)
Attest:

RUTH C. MASON
Attesting Officer

C. MARSHALL DANN
Commissioner of Patents
and Trademarks